United States Patent
Cybart et al.

(10) Patent No.: US 7,999,660 B2
(45) Date of Patent: *Aug. 16, 2011

(54) ELECTRONIC DEVICE WITH SUSPENSION INTERFACE FOR LOCALIZED HAPTIC RESPONSE

(75) Inventors: Adam Cybart, McHenry, IL (US); Richard Gordecki, Green Oaks, IL (US); Ngee Lee, Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 375 days.

This patent is subject to a terminal disclaimer.

(21) Appl. No.: 12/249,666

(22) Filed: Oct. 10, 2008

(65) Prior Publication Data

US 2010/0090814 A1  Apr. 15, 2010

(51) Int. Cl.
    *G08B 6/00* (2006.01)
(52) U.S. Cl. .............. 340/407.2; 340/407.1; 340/12.54; 340/12.55; 340/13.24; 340/13.31; 340/13.32; 345/156; 345/157; 345/168; 455/566
(58) Field of Classification Search ............. 340/407.2, 340/407.1, 825.22, 12.54, 12.55, 13.24, 13.31, 340/13.32; 341/22, 20, 34; 345/156, 168–170, 345/157, 173–175, 177, 520; 455/566
See application file for complete search history.

(56) References Cited

U.S. PATENT DOCUMENTS

| | | | |
|---|---|---|---|
| 6,389,302 | B1 | 5/2002 | Vance |
| 6,710,518 | B2 | 3/2004 | Morton et al. |
| 6,911,901 | B2 | 6/2005 | Bown |
| 7,129,824 | B2 | 10/2006 | Cranfill et al. |
| 2002/0025837 | A1* | 2/2002 | Levy ............... 455/566 |
| 2002/0084721 | A1 | 7/2002 | Walczak |
| 2003/0076298 | A1* | 4/2003 | Rosenberg ............ 345/156 |
| 2003/0174121 | A1* | 9/2003 | Poupyrev et al. ...... 345/156 |
| 2006/0028428 | A1 | 2/2006 | Dai et al. |
| 2006/0050059 | A1 | 3/2006 | Satoh et al. |
| 2006/0052143 | A9 | 3/2006 | Tuovinen |
| 2006/0097400 | A1 | 5/2006 | Cruz et al. |
| 2007/0040815 | A1 | 2/2007 | Rosenberg et al. |
| 2008/0100568 | A1 | 5/2008 | Koch et al. |

OTHER PUBLICATIONS

Yacob, Sisay "First Office Action", U.S. Appl. No. 12/249,405 First Inventor: Richard Je, filed Oct. 10, 2008, Mailed: Nov. 19, 2010.

* cited by examiner

*Primary Examiner* — George Bugg
*Assistant Examiner* — Sisay Yacob

(57) ABSTRACT

An electronic device (100) is configured to deliver a localized haptic feedback response (101) to a user. The electronic device (100) includes a device housing (107) and an interface assembly having a display lens (202) or other user interface surface and a motion generation device (212) affixed to the interface assembly. A compliance member (204) is disposed between the device housing (107) and the interface assembly. The compliance member (204) suspends the interface assembly from the device housing (107) and permits the interface assembly to physically move relative to the device housing (107) in response to actuation of the motion generation device (212), thereby delivering a localized tactile response to a user.

18 Claims, 6 Drawing Sheets

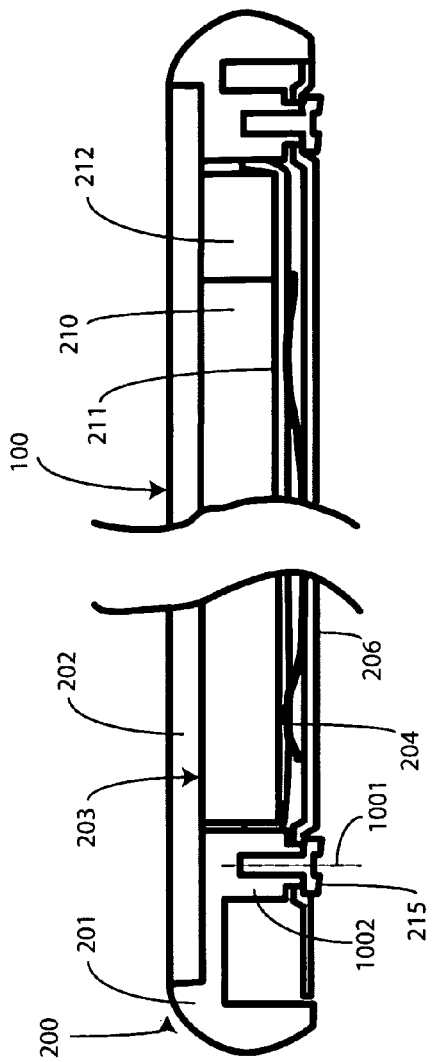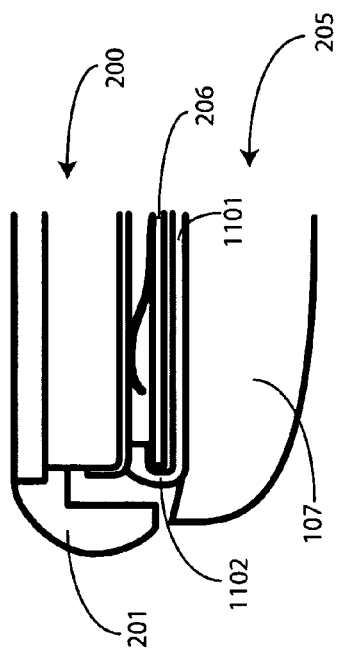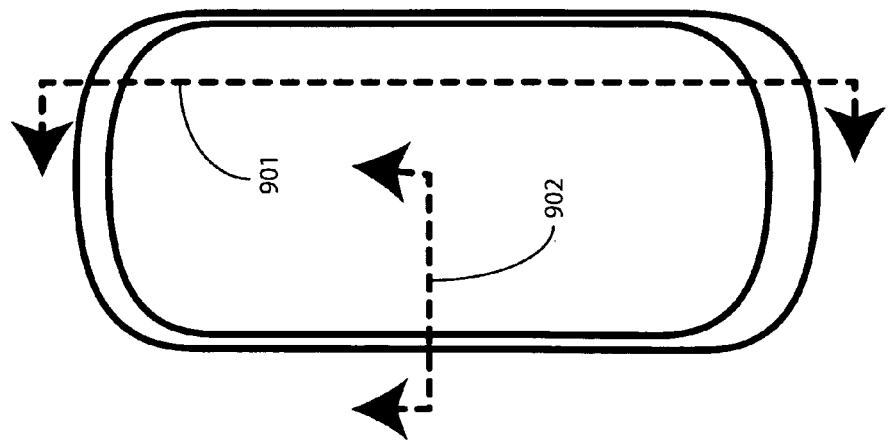

ELECTRONIC DEVICE WITH SUSPENSION INTERFACE FOR LOCALIZED HAPTIC RESPONSE

BACKGROUND

1. Technical Field

This invention relates generally to electronic devices having tactile feedback mechanisms, and more particularly to a device having one or more motion generators coupled to a user interface surface, where the user interface surface is suspended relative to the device housing such that a local haptic response may be delivered to the user interface surface.

2. Background Art

Mobile telephones and other similar portable electronic devices are becoming increasingly popular. As more and more users carry these electronic devices, manufacturers are designing smaller devices with increased functionality. By way of example, not too long ago a mobile telephone was a relatively large device. Its only function was that of making telephone calls. Today, however, mobile telephones fit easily in a shirt pocket and often include numerous "non-phone" features such as cameras, video recorders, games, and music players.

Just as the feature set included in electronic devices has become more sophisticated, so too has the hardware itself. For instance, not too long ago most portable electronic devices included manually operated buttons. These buttons, which were generally limited to the numbers one through nine and zero, as well as a functional button or two, were generally dome-shaped, popple style buttons that a user depressed for actuation. Today, however, manufacturers are building devices with "touch sensitive" screens and user interfaces that include no popple style buttons. They instead include capacitive or other touch sensors that are configured to detect a user's touch. Where the user's touch is detected as corresponding to a user actuation target or other control icon, the device responds just as if a manual button had been pressed by the user.

A problem with these touch sensitive user interfaces is that the user is unable to experience the manual, tactile feedback associated with popple style buttons. Touch sensitive user interfaces are generally no more than a flat surface made of glass or plastic. When the user places his finger above a user actuation target, there is no mechanical response, i.e., no button "pushing back" after being depressed, thereby notifying the user that the button has been pressed.

Designers have grappled with this problem for some time. One prior art solution posed is to provide an audible "click" when a user's touch is detected. However, this solution has problems in that audible sounds are not permissible in some environments, such as libraries and theaters. Further, the user is often unable to hear the audible click in loud or outdoor environments.

A second solution is to provide a vibration device within the electronic device to make the overall device shake when a user's touch is detected. For instance, some manufacturers include a motor that spins an unbalanced weight to make the overall device vibrate. This response is often unwelcome by the user, however, in that it fails to simulate the positive tactile feedback of a single button. Additionally, causing the entire device to vibrate may make actuation of small targets along the user interface difficult due to the motion of the overall device.

There is thus a need for an improved tactile feedback system for an electronic device that provides a more localized haptic experience.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 9, 10, and 11 show a plan and sectional views of the components associated with a portable electronic device configured to provide localized haptic feedback in accordance with embodiments of the invention.

Figure 1:
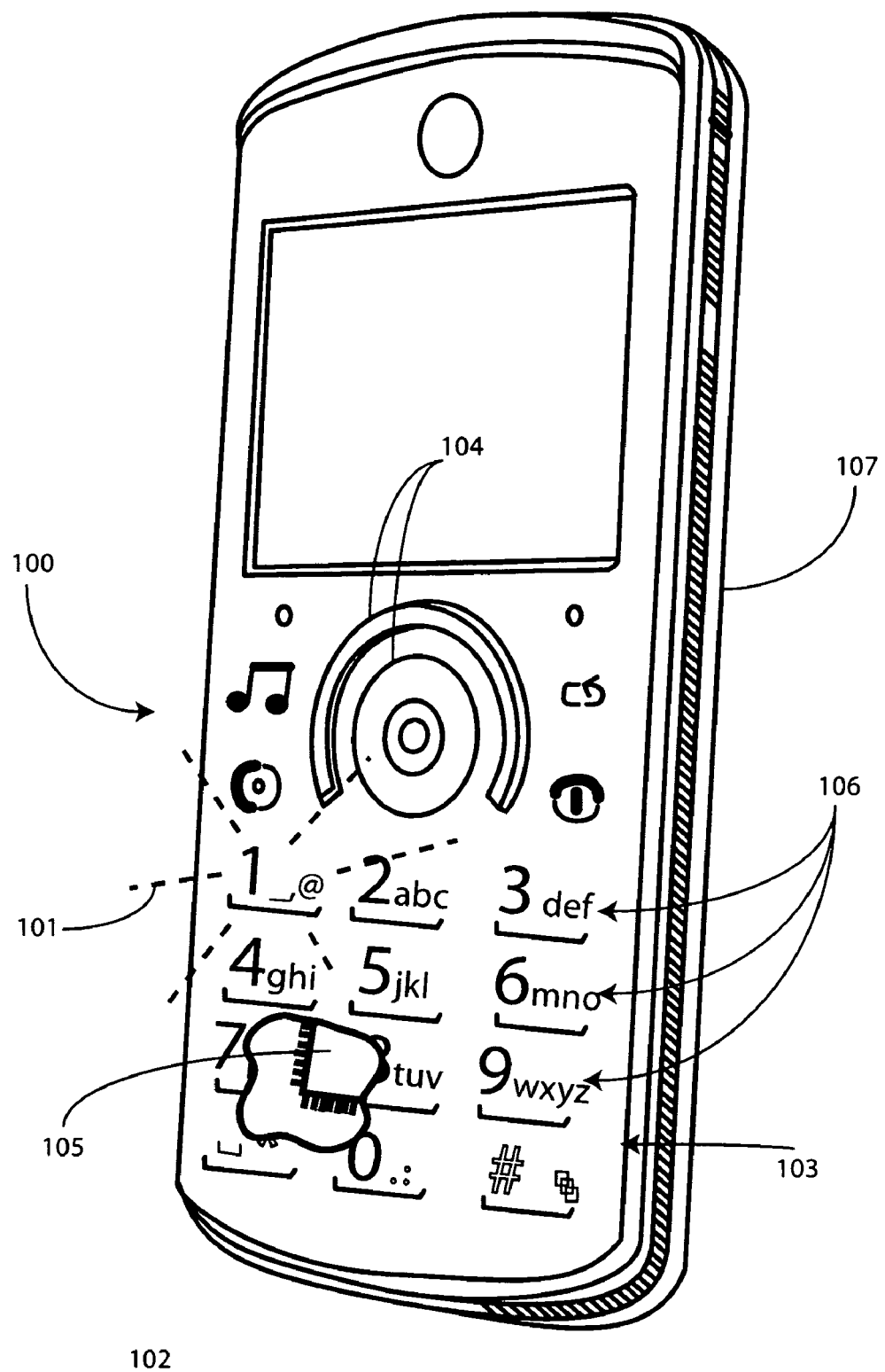
FIG. 1 illustrates an electronic device configured to provide a localized haptic response to a user in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to providing a localized haptic response to a user in an electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of providing drive signals to motion generation devices, or detecting a user's touch through a touch sensing device, for example, as described herein. The non-processor circuits may include, but are not limited to, microprocessors, signal drivers, clock circuits, power source circuits, and user input devices. As such, these functions may be interpreted as steps of a method to perform the operation of providing a localized haptic response. It is expected that one of ordinary skill, notwithstanding possibly significant effort and many design choices motivated by, for example, available time, current technology, and economic considerations, when guided by the concepts and principles disclosed herein will be readily capable of generating such methods and apparatuses with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide an assembly suitable for a portable electronic device that enables a localized haptic responses to be delivered to a user. In one embodiment, the portable electronic device includes a device body and a user interface having a vibration device affixed thereto. The user interface is suspended from the body by a compliant isolation device such that, upon actuation of the vibration device, the user interface can vibrate substantially independently of the device body.

In one embodiment, the user interface is a rigid, touch sensitive user interface manufactured from glass, reinforced glass, or plastic. A vibration device, such as a piezo-electric transducer, is affixed to the user interface within the device. A control circuit within the user interface works in conjunction with a capacitive or other touch sensor to determine when a user actuates the user interface. Upon detecting the user's contact, the control circuit delivers an actuation signal to the vibration device, thereby causing both the vibration device and the user interface to deliver a haptic response to the user. The vibration device generates motion at a frequency and amplitude such that portion of the user interface touching the user's finger vibrates against the finger.

The haptic response is localized by a compliant isolation device, which in one embodiment is a cantilevered leaf spring configured to bias the user interface away from the housing of the electronic device. The user interface is, in one embodiment, mechanically suspended from the base structure of the electronic device. The compliant isolation device works as an isolator in that it permits the user interface to move with the vibration device while the housing or body remains substantially isolated of the user interface. As such, the body remains substantially stable. When the actuation signal is an impulse, the user feels a "pop" or "click" haptic response, which feels to the user like a popple type button returning to its steady state position from an actuated position.

While the popple type simulated response is one type of haptic feedback that can be delivered to the user, embodiments of the invention permit other responses to be delivered as well by changing the duration, frequency, or shape of the actuation signal. As the user interface is suspended and its mass moves somewhat independently from the base structure of the device, the vibration device can be tuned to emphasize the haptic response, which results in an even more localized and noticeable response to the user. For instance, the acutation signal can be tuned such that the user interface assembly vibrates at or near a resonant frequency, thereby accentuating the haptic response. Further, movement of the user interface can be configured so as to only move in a direction opposite the direction of the user's force input. Additionally, the compliance member can be tuned with its spring constant to improve the haptic response. Embodiments of the present invention provide a low cost, mechanically reliable method of coupling a vibration device to the user interface to improve the overall user experience.

Turning now to FIG. 1, illustrated therein is one embodiment of an electronic device 100 configured to provide a localized haptic feedback response 101 to a user. The electronic device includes an interface assembly 102 having a user interface surface 103. In one embodiment, the user interface surface 103 is a contiguous surface, such as a substantially flat pane of glass, reinforced glass, plastic, or coated plastic. This contiguous surface may be placed atop a singular display that is configured to both present information and user actuation targets to a user. Alternatively, the contiguous surface may be placed atop multiple displays, such as a high-resolution display for presenting information to a user and a low-resolution or charged pigment display configured to present actuation targets to the user. Further, the user interface surface may include dedicated controls such as a navigation device or home button.

Where a single display is used beneath the user interface surface, suitable displays include liquid crystal displays (LCDs) or other comparable devices that are configured to text and images to a user by altering a large number of pixels which, when viewed collectively by a user, form the presented text or image. Where multiple displays are used, an informational display may include a high resolution display such as an LCD, while user actuation targets are presented by a lower resolution display such as a segmented display.

Regardless of the type of display used, in one embodiment the user interface surface 103 forms the top layer of a touch sensitive interface assembly. Rather than employing buttons, a control circuit 105 is disposed within the device and is capable of executing embedded software commands stored in a corresponding memory to present user actuation targets 106 along the user interface surface. The control circuit 105 can be embodied by a microprocessor, programmable logic, or other control circuit, and executes programmable instructions stored in an associated memory. When a user touches any of these user actuation targets 106, the control circuit 105—by way of a capacitive sensor or other touch sensing device—senses the user contact and functions as if a button corresponding to the user actuation target 106 has been pressed.

Advantages of a touch sensitive interface configuration are numerous. One advantage, for instance, is that the user actuation targets 106 can be configured in accordance with the operational modes of the electronic device 100. For instance, in FIG. 1, the electronic device is configured as a mobile telephone. As such, the user interface information of FIG. 1 comprises a plurality of user actuation targets 106 arranged as a twelve-digit key pad and associated controls. Where the electronic device 100 changes operational modes from mobile telephone mode to, for instance, a photo capture mode, the user interface information morphs from the twelve-digit keypad to a photo capture control set.

As noted above, however, one problem with prior art touch sensitive devices is that the user does not receive tactile feedback upon actuating a user actuation target 106. Embodiments of the present invention correct this problem by providing a localized haptic feedback response 101 to a user through methods and apparatuses set forth in the following discussion and figures. This localized haptic feedback response 101 is sensed by the user through the user interface surface 103. In one configuration, this response is felt as a "click" or "pop" while the main housing 107 of the electronic device 100 remains more or less stable. In other configurations, the response can be tailored to a particular application. For example, gaming applications may employ a more stylized haptic response.

Figure 2:
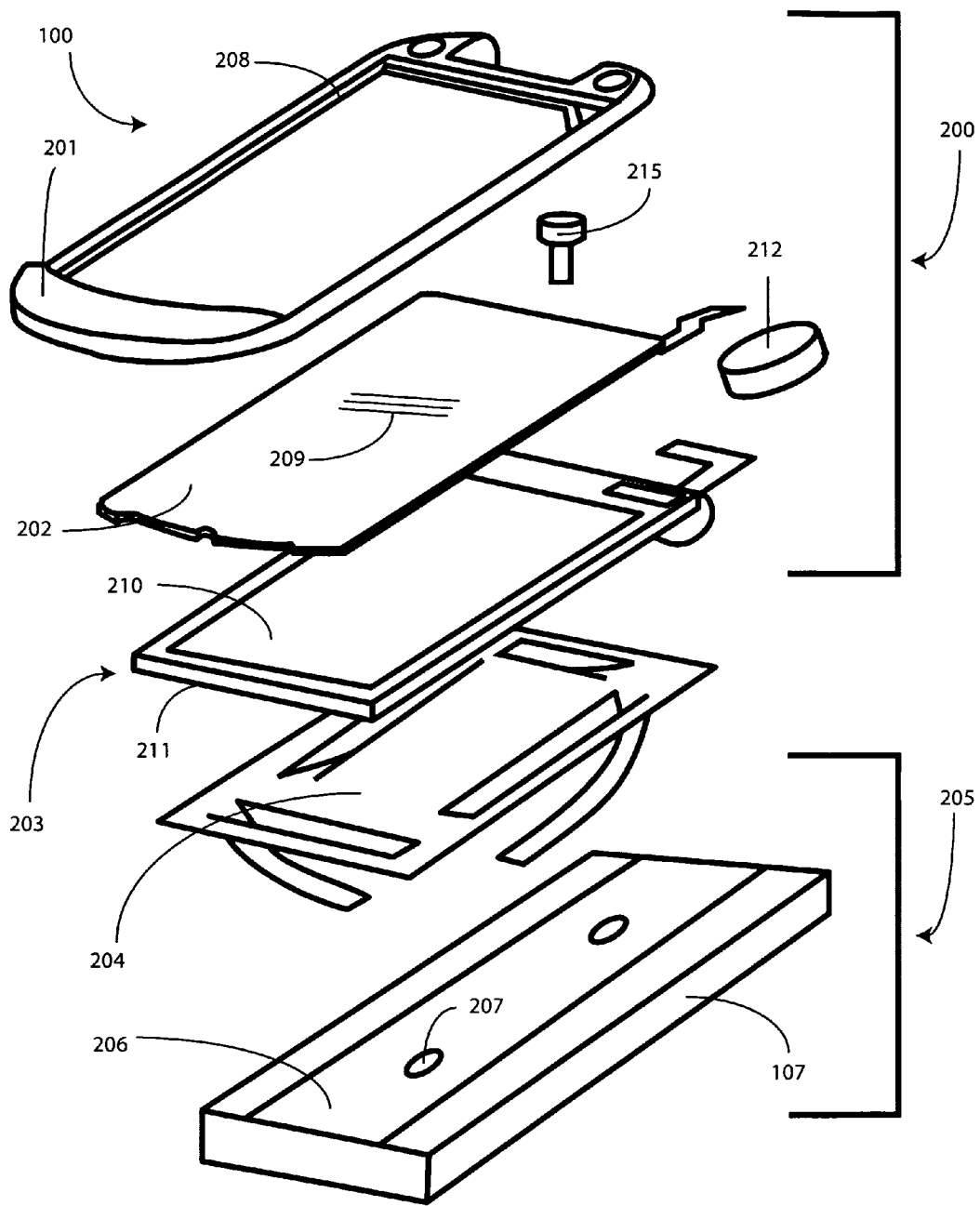
FIG. 2 illustrates an exploded view of various components of an electronic device configured to provide a localized haptic response to a user in accordance with embodiments of the invention.

Turning now to FIG. 2, illustrated therein is an exploded view of the major components of one embodiment of an electronic device 100 configured to provide a localized haptic feedback response (101) to a user in accordance with embodiments of the invention. Starting from the top, an upper assembly 200 includes an upper housing 201, a display lens 202, a display assembly 203, and a compliance member 204. A lower assembly 205 includes the device housing 107 and a mechanical support plate 206 disposed therein.

Beginning with the upper assembly 200, the first major component is an upper housing 201. The upper housing 201 interconnects with the device housing 107 to form the outer mechanical structure of the electronic device. The upper housing 201 can be manufactured from plastic, polymers, metal, or other suitable materials. In one embodiment, the upper housing 201 is manufactured from a rigid plastic such as ABS by way of an injection molding process. Similarly, the device housing 107 may be manufactured from metal, plastic, or other rigid materials.

The upper housing 201 can include boss recesses into which mechanical boss members 215 may be inserted. As will be shown in more detail with the discussion of FIG. 9, the boss members 215 can function as limited motion linkages or couplings when the localized haptic response is being delivered.

In one embodiment, at least two boss members 215 are used. The boss members 215 are coupled to the upper housing 201. When boss members 215 are employed, apertures 207 are included in the mechanical support plate 206. The boss members 215 are fixedly coupled to the upper housing 201. When the electronic device 100 is assembled, the boss members 215 protrude through the apertures 207 and work to retain the upper assembly 200 and lower assembly 205 together while permitting haptic movement of the upper assembly 200 relative to the lower assembly 205. This will be illustrated in more detail with reference to FIG. 9.

A display lens 202 fits into a recess 208 of the upper housing 201 such that the upper housing 201 is disposed about a perimeter of the display lens 202. In one embodiment a compliant member, such as a peripheral gasket manufactured from Poron®, is used to seat the display lens 202 within the recess 208. The display lens 202 functions as the user interface surface for the electronic device 100. The display lens 202 can be manufactured from plastic, glass, reinforced glass, or other suitable materials that are both rigid and sufficiently translucent. For instance, in one embodiment the display lens 202 comprises a thin sheet of reinforced glass. A strengthening process may be use to reinforce the glass, such as a chemical or heat treatment process. In addition to serving as the user interface surface, the display lens 202 prevents dust, debris and liquids from invading the device.

In one embodiment, the display lens 202 is configured as substantially transparent. In such an embodiment, a display assembly 203 disposed beneath the display lens 202 presents all text, graphics, and user actuation targets (106). In some embodiments, selective printing may included on the front or rear face of the display lens 202. Such printing may be desired, for example, around the perimeter of the display lens 202 to cover electrical traces connecting the various layers. Additionally, subtle textural printing or overlay printing may be desirable to provide a translucent matte finish atop the display lens 202. Such a finish is useful to prevent cosmetic blemishing from sharp objects or fingerprints. The display lens 202 may also include an integral ultra-violet barrier. Such a barrier can be useful in improving the visibility of the display 210 and in protecting internal components of the electronic device 100.

Contact with the user interface surface can be detected, in one embodiment, with a touch sensor such as a capacitive touch sensor. While a capacitive touch sensor will be used as an illustrative touch sensor herein, it will be clear to those of ordinary skill in the art having the benefit of this disclosure that other types of touch sensors may also be used. The illustrative capacitive touch sensor is operable with the control circuit (105). When a user touches to the user interface, and the touch sensor layer comprises a capacitive touch sensor, the control circuit (105) detects this touch as a change in capacitance. The control circuit (105) can then be configured to generate an actuation signal in response so as to deliver the localized haptic feedback response (101) as will be described below.

The capacitive touch sensor can be constructed on its own substrate, which would be disposed beneath the display lens 202. In one embodiment, however, the capacitive touch sensor is be constructed by depositing small capacitive plate electrodes 209 on the bottom of the display lens 202. In one embodiment the capacitive plate electrodes 209 comprise indium-tin oxide ($In_2O_3$ —$SnO_2$) layers deposited upon the display lens 202. In such a configuration, the display lens 202 serves as the substrate for the capacitive touch sensor. These capacitive plate electrodes 209 define a particular capacitance. When an object, such as the user's finger becomes proximately located with the user interface surface, a capacitance detection circuit module of the control circuit (105) detects a change in the capacitance of a particular plate combination. The capacitive sensor may be used in a general mode, for instance to detect the general proximate position of an object along the user interface surface. The capacitive sensor may also be used in a specific mode, where a particular capacitor plate pair may be detected to detect the location of an object along length and width of the user interface surface.

In some embodiments, it is helpful to know not only when a user touches the user interface surface, but also how hard the user interface surface is being pressed. For instance, in some gaming devices, game controls can correspond not only to finger placement along the user interface surface but also with the amount of pressure placed upon the user interface surface by the user. Where contact force is desired, the capacitive touch sensor can be configured as a force sensor. Such a capacitive force sensor is disclosed in commonly assigned, co-pending U.S. patent application Ser. No. 12/181,923, entitled "Single Sided Capacitive Force Sensor for Electronic Devices," filed Jul. 29, 2008, which is incorporated herein by reference. Where such a force sensor is used, the control circuit (105) can be configured to refrain from delivering the haptic feedback response until the user applies at least a predetermined force—such as 0.25 lbs—upon the user interface surface. Alternatives of the capacitive force sensing device may also be used. For instance, a force sensing device such as a force sense resistor layer can be placed beneath the display lens 202 rather than using a capacitive force sensing device.

The display assembly 203 can include one or more displays 210 and is disposed beneath the display lens 202 and opposite the top of the display lens 202, which works in FIG. 2 as the user interface surface. The display 210 may be coupled to a mechanical support, such as a display carrier 211 shown in FIG. 2. The display carrier 211 functions as a rigid support member and may be fixedly coupled to the upper housing 201 between the compliance member 204 and the display lens 202.

In one embodiment, a single LCD, such as a reflective or backlit LCD, is used to present graphics, text, and user actuation targets along the user interface surface. As such a display employs liquid crystal as its active layer, the display carrier 211 provides mechanical support to enhance the reliability of the display 210. Electronic circuitry (not shown) can be coupled to the display assembly 203 by way of a substrate, which may be flexible or rigid. The electrical circuitry, which may be integrated with the control circuit (105), works in conjunction with the control circuit (105) to drive and power the display 210.

One or more motion generation devices 212, such as coin-type piezo-electric transducers or vibration devices, are affixed to the display lens 202. As will be shown in more detail in the discussion of FIGS. 6-8, the motion generation device 212 can be affixed to the display lens 202 adjacent to the display assembly 203 or beneath the display assembly 203. Where disposed beneath the display assembly 203, the motion generation device 212 may be coupled to the display carrier 211 or other mechanical structure so as not to impair the operation of the display 210. While piezo-electric transducers are one type of suitable motion generation device, others can be used with embodiments of the invention as well, including linear motion generation devices and rotational motion generation devices.

When the control circuit (105) determines by way of the capacitive sensor that a user has actuated the user interface, the control circuit (105) delivers a drive signal to the motion generation device 212 or devices. This drive signal actuates the corresponding motion generation device, thereby causing display lens 202 to move. As the display lens 202 is coupled to the upper housing 201, the upper assembly 200 moves with the display lens 202. Thus, a localized haptic force is delivered from the motion generation device 212 to the user by way of the upper assembly 200.

Beneath the display assembly 203 is a compliance member 204. In one embodiment, the display assembly 203 is disposed between the display lens 202 and the compliance member 204. When the electronic device 100 is assembled, the compliance member 204 in one embodiment is disposed between the mechanical support plate 206 of the device housing 107 and the upper assembly 200. The compliance member 204 can be coupled to either or both of the upper assembly 200 and lower assembly 205.

The compliance member 204 converts the otherwise global haptic response delivered by the motion generation device 212 to a localized haptic response by functioning as an isolation device between the upper assembly 200 and the lower assembly 205. The compliance member 204, which in one embodiment is one or more cantilevered or leaf spring assemblies manufactured from springy metal such as spring steel, is configured to bias the upper assembly 200 away from the lower assembly 205, thereby mechanically suspending the upper assembly 200 and user interface surface from the lower assembly 205 and the device housing 107. In so doing, the compliance member 204 allows the user interface to physically move relative to the device housing 107 in response to actuation of a motion generation device 212.

In one embodiment, the compliance member 204 comprises a combination of compressible material and metal springs. For example, a compressible foam and leaf spring combination can be used. It will be clear to those of ordinary skill in the art having the benefit of this disclosure that a unitary compliance member may be used rather than a combination of compliance members. For instance, a unitary piece of spring metal having a plurality of leaf springs protruding therefrom, as shown in FIG. 2, may be used as the compliance member 204 as well.

In one embodiment, the mass of the upper assembly 200 is configured to be less than the mass of the lower assembly 205. Such a configuration helps to provide stability to the lower assembly 205 when the upper assembly 200 is delivering the haptic response. For example, in one embodiment the device housing mass is at least two times that of the upper assembly mass.

Figure 3:
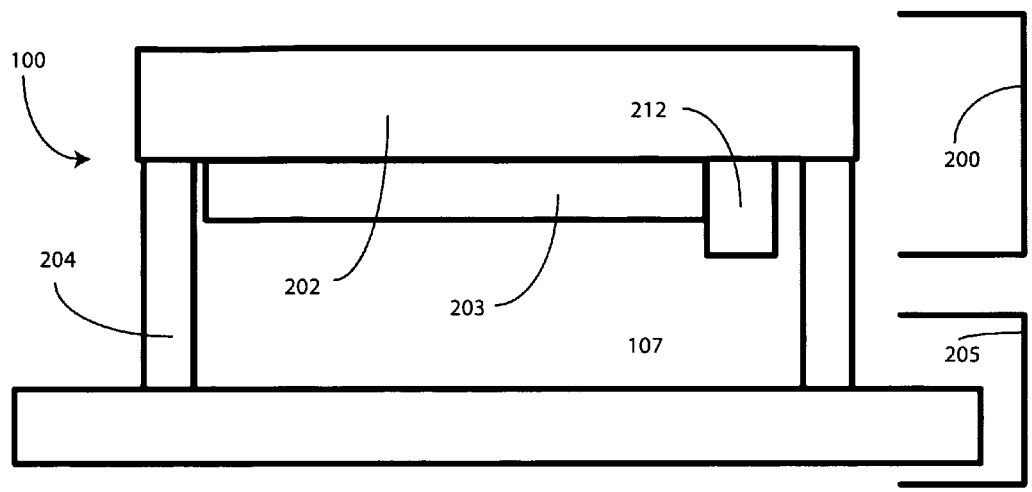
FIGS. 3 and 4 illustrate a sectional view of one embodiment of an electronic device configured to provide a localized haptic response in accordance with the invention at rest and during vibration, respectively.
Figure 4:
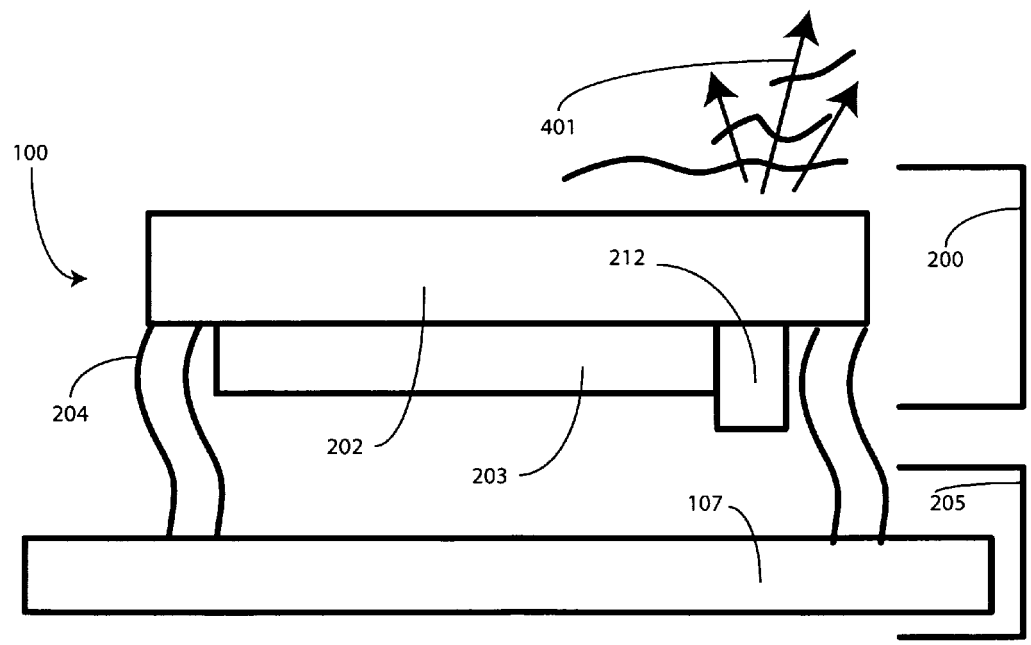

Turning now to FIGS. 3 and 4, illustrated therein are a sectional block diagrams of an electronic device 100 configured to provide a haptic response to a user in accordance with embodiments of the invention. FIG. 3 illustrates the electronic device 100 at rest, while FIG. 4 illustrates the electronic device 100 delivering the haptic feedback, i.e., when the motion generation device 212 is active. FIGS. 3 and 4 illustrate the "localized" nature of the haptic response, which contrasts with the global response of some prior art systems.

In FIGS. 3 and 4, a simplified upper assembly 200 and lower assembly 205 can be seen. The simplified upper assembly 200 includes the display lens 202, the display assembly 203 coupled to the display lens 202 beneath the display lens 202, and a motion generation device 212 affixed to the display lens 202 adjacent to the display assembly. The simplified lower assembly 205 includes the device housing 107, which can have disposed therein additional device circuitry and components such as a battery and power source, antenna components, transceivers, and so forth.

The compliance member 204 is disposed between the lower assembly 205 and the upper assembly 200. The compliance member 204 suspends the upper assembly 200 from the lower assembly 205. The compliance member 204 also allows the upper assembly 200 to physically move relative to the lower assembly 205 in response to actuation of the motion generation device 212. The rest position is shown in FIG. 3. In FIG. 4, the motion generation device 212 is actuated.

The haptic response force 401 is localized in nature due to the action of the compliance member 204. As noted before, this localized nature of the haptic response force 401 can be enhanced when the mass of the upper assembly 200 is less than the mass of the lower assembly 205. Further, due to the configuration of the compliance member 204, the assemblies vibrate or move at different rates depending upon the frequency induced by the motion generation device 212. In one embodiment, the drive signal applied to the motion generation device 212 can be tuned to the resonant frequency of the overall system. Even where this is not the case, displacement of the upper assembly 200 will be greater than displacement of the lower assembly 205 when the motion generation device 212 is actuated. As a result, the user feels a difference in vibration between the lower assembly 205 and the upper assembly 200. This difference is perceived as a localized haptic response.

Turning now to FIGS. 5-8, illustrated therein are various configurations of the components in an electronic device 100 capable of providing a localized haptic response to a user. Each of the configurations illustrated in FIGS. 5-8 function as described above. However, due to the placement of each component, haptic responses will be slightly different. A particular configuration can be selected by a designer based upon application requirements and constraints, such as housing material, type or number of displays, compliant device spring constant, type of motion generation device, etc.

Figure 5:
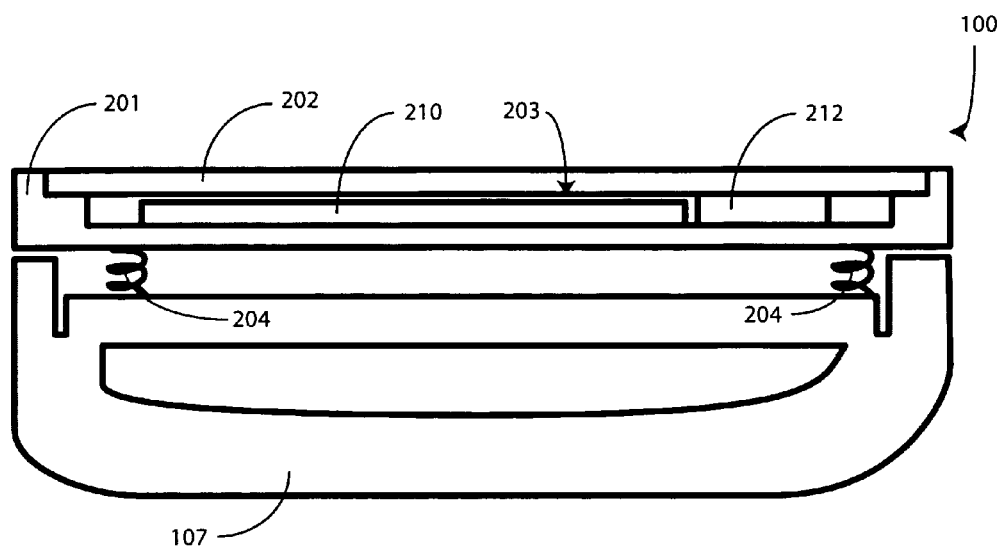
FIG. 5 illustrates a sectional view of one configuration of an electronic device configured to provide a localized haptic response in accordance with embodiments of the invention.

In FIG. 5, the display lens 202 is seated in the upper housing 201. The display assembly 203 is positioned beneath the display lens 202. Specifically, the display 210 sits atop an extension of the upper housing 201, which forms the display carrier 211. The display 210 is thus not physically affixed to the display lens 202, but is physically fixed relative to the display lens 202. The motion generation device 212 is adjacent to the display assembly 203, and is fixed between the upper housing 201 and the display lens 202. The compliance member 204 separates the device housing 107 from the upper housing 201, thereby permitting the upper housing 201 to physically move relative to the device housing 107.

Figure 6:
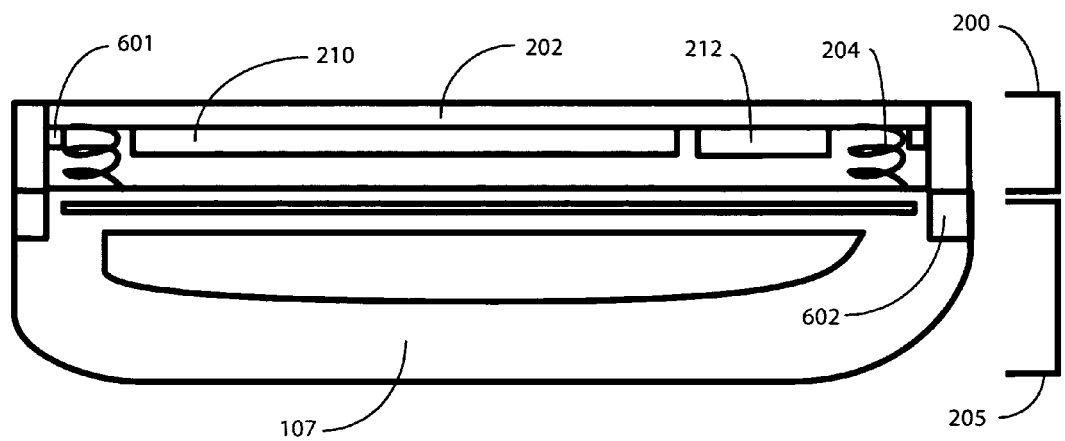
FIG. 6 illustrates a sectional view of one configuration of an electronic device configured to provide a localized haptic response in accordance with embodiments of the invention.

Turning now to FIG. 6, illustrated therein is an alternate configuration of the electronic device 100. In FIG. 6, the display 210 has been affixed to the display lens 202, as has the motion generation device 212. The display 210 may optionally include a display carrier (211). However, as no forces are being applied to the bottom of the display 210, certain applications can be manufactured without a display carrier (211). In this configuration, the upper assembly 200 includes only the display lens 202, the display 210 and the motion generation device 212. This upper assembly 200 is separated from the lower assembly 205 that includes the device housing 107.

Figure 7:
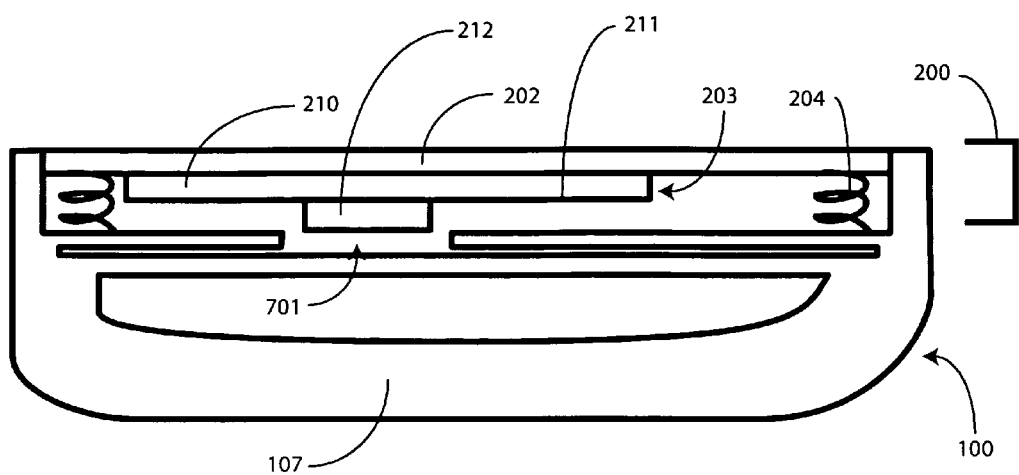
FIG. 7 illustrates a sectional view of one configuration of an electronic device configured to provide a localized haptic response in accordance with embodiments of the invention.
Figure 8:
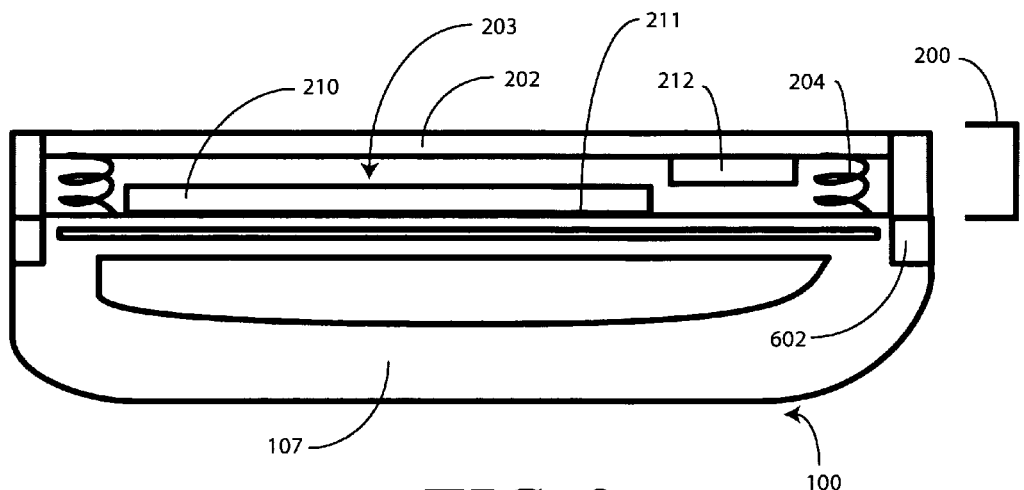
FIG. 8 illustrates a sectional view of one configuration of an electronic device configured to provide a localized haptic response in accordance with embodiments of the invention.

The device housing 107 in this embodiment, as also with the embodiments of FIGS. 7 and 8 may be a unitary housing. A separate upper housing (201) would not included. This would be the configuration used in "candy bar" type electronic devices. Alternatively, the device housing 107 of this embodiment can comprise two housing components that are joined by a coupling 602. Such a coupling 602 could be, for instance, a slider coupling that allows an upper portion of the electronic device 100 to slide relative to a lower portion. For instance, in a mobile telephone application, the upper portion may slide relative to the lower portion so as to reveal a touch-sensitive or popple style keypad. Alternatively, the coupling 602 may be a flip type coupling or rotational coupling as well.

The compliance member 204 suspends the upper assembly 200 from the device housing 107. When the motion generation device 212 is actuated, the upper assembly 200 physically moves relative to the device housing 107, thereby providing the localized haptic response.

In such a configuration, the display lens 202 must be sufficiently sealed into the device housing 107. However, the seal should not be so tight that motion of the display lens 202 somewhat independently of the device housing 107 is prohibited. One suitable sealing mechanism is a gasket 601 of 0.50 mm Poron® or SCF100 material coupled to the device body 107 and about the perimeter of the device lens 202 with adhesive tape. This gasket 601 allows movement of the display lens 202 relative to the device body 107 through compression and relaxation. Such a gasket 601 can serve as the compliance member 204. Alternatively, additional compliance components, such as leaf springs, can be added so as to tailor the haptic feedback as desired.

Turning now to FIG. 7, illustrated therein is another configuration of the electronic device 100. FIG. 7 is similar to FIG. 6 in that the display 210 is affixed to the display lens 202 and the device body 107 is unitary, with the display lens 202, display 210, and motion generation device 212 comprising the upper assembly 200. FIG. 7 differs slightly from FIG. 6 in that the motion generation device 212 is disposed beneath the display 210. As such, the display assembly 203 will include both the display 210 and a display carrier 211 configured to protect the display 210 from forces applied to the display assembly 203 by the motion generation device 212. A clearance aperture 701 is cut within the device housing to prevent interference between the motion generation device 212 and the device housing 107.

Turning now to FIG. 8, illustrated therein is yet another configuration of the electronic device 100. In FIG. 8, the display 210 is affixed to the device housing 107, with the device housing 107 serving as the display carrier 211. The motion generation device 212 is affixed to the display lens 202, thereby creating a lighter upper assembly 200. As with FIGS. 6 and 7, a gasket or gasket-spring combination can be used as the compliance member 204. Also, the device housing 107 can be unitary for candy bar applications, or alternatively the device housing 107 can be an upper portion and lower portion joined by a coupling 602.

Turning now to FIGS. 9-11, illustrated therein are a plan view of an electronic device 100 configured to provide localized haptic responses to a user, along with sectional views showing detailed configurations of the internal components of the electronic device 100. FIG. 9 illustrates the top, plan view showing sectional lines 901 and 902. FIG. 10 is a sectional view cut along sectional line 901 of FIG. 9, while FIG. 11 is a sectional view cut along sectional line 902 of FIG. 9.

Beginning with FIG. 10, illustrated therein is the upper assembly 200 comprising the display lens 202, the display assembly 203 that includes both display 210 and display carrier 211, the upper housing 201, and the motion generation device 212. For simplicity of illustration, the device body (107) is not shown in FIG. 10, but is in FIG. 11. However, the mechanical support plate 206, which is fixedly disposed within the electronic device 100, is shown in FIG. 10. The upper assembly 200 is configured to move substantially independently relative to the mechanical support plate 206 and lower assembly (205).

The compliance member 204 in FIG. 10 is a cantilever spring member that is disposed between the mechanical support plate 206 and the display assembly 203. The cantilever spring member is configured to bias the upper assembly 200 away from the lower assembly The upper assembly 200 away from the lower assembly (205). Two boss members 215 are coupled to the upper housing 201 of the upper assembly 200 so as to retain the upper assembly 200 and lower assembly (205) together by protruding through apertures in the mechanical support plate 206.

The boss members 215 serve as limited motion linking couplings in that they can be configured to limit physical movement of the upper assembly 200 relative to the lower assembly (205) to less than a predetermined amount. For instance, upon actuation of the motion generation device 212, which in the illustrative embodiment of FIG. 10 is a piezoelectric motion generation device, the upper assembly 200 is permitted to move along a lengthwise axis 1001 of the boss member 215 relative to the mechanical support plate 206 and the lower assembly (205) a limited amount. In one embodiment, this motion is limited by recesses in the boss member supports 1002 to one millimeter or less. Some applications will limit the motion even more, such as to 0.2 millimeters or less.

Turning now to FIG. 11, illustrated therein is one example of a coupling 602 referenced in FIGS. 6-8 above. In FIG. 11, the coupling 602 is a slider coupling. Specifically, a slide guide rail 1101 is configured to capture the mechanical support plate 206 so as to permit sliding motion of the upper assembly 200 relative to the lower assembly 205. This slider coupling helps to isolate the device housing 107 from the user interface, thereby enhancing the haptic response delivered to the user. In this configuration, the mechanical support plate 206 is disposed within the upper assembly 200. It is clear from the description above, however, that the mechanical support plate may be disposed in the device housing 107 in other applications. To facilitate a sliding motion, a friction reducing material 1102 may be included in the coupling 602.

Embodiments of the present invention illustrated and described herein provide an electronic device capable of providing a more selective or localized haptic response to the user interface surface than do prior art systems. Further, embodiments of the present invention are less complex, more reliable, and lower cost than are other prior art haptics systems. In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device configured to provide a haptic response to a user, the electronic device comprising:
   a device housing;
   an interface assembly having a user interface surface and comprising a motion generation device affixed to the interface assembly;
   at least one limited motion linkage configured to limit physical movement of the interface assembly relative to the device housing to less than a predetermined amount; and
   a compliance member disposed between the device housing and the interface assembly, thereby mechanically suspending the interface assembly from the device housing and allowing the interface assembly to physically move relative to the device housing in response to actuation of the motion generation device.

2. The electronic device of claim 1, wherein the interface assembly comprises at least one display, coupled to the interface assembly opposite the user interface surface and fixed relative to the interface assembly.

3. The electronic device of claim 1, wherein the electronic device further comprises an interface housing coupled to the interface assembly and disposed about the user interface surface.

4. The electronic device of claim 3, wherein the interface assembly further comprises a rigid support member coupled to the interface housing and disposed between the user interface surface and the compliance member.

5. The electronic device of claim 3, wherein the at least one limited motion linkage couples the interface housing with the device housing, wherein the at least one limited motion linkage is configured to limit physical movement of the interface assembly relative to the interface housing to less than the predetermined amount.

6. The electronic device of claim 5, wherein the device housing comprises further a support plate coupled thereto, wherein the compliance member is fixedly coupled to the support plate between the support plate and the interface assembly.

7. The electronic device of claim 6, wherein the support plate defines at least one aperture, further wherein the at least one limited motion linkage comprises at least one boss member coupled to the interface housing and protruding through the at least one aperture.

8. The electronic device of claim 1, wherein the compliance member comprises one or more leaf springs configured to bias the interface assembly away from the device housing.

9. The electronic device of claim 8, wherein the compliance member comprises a unitary piece of spring metal having a plurality of leaf springs protruding distally therefrom.

10. The electronic device of claim 1, wherein the interface assembly further comprises a touch sensor and a control circuit operable therewith, wherein the control circuit is configured to, upon the touch sensor detecting at least a predetermined force incident upon the user interface surface, provide a motion actuation signal to the motion generation device, thereby causing the interface assembly to vibrate relative to the device housing.

11. The electronic device of claim 10, wherein the touch sensor comprises a capacitive touch sensor comprising a control circuit and at least one electrode pair defining a capacitance, wherein the control circuit coupled to the at least one electrode pair is configured to detect a change in the capacitance when an object becomes proximately located with the user interface surface.

12. The electronic device of claim 1, wherein the motion generation device comprises one of a piezoelectric transducer, a linear motion generation device, or a rotational motion generation device.

13. The electronic device of claim 1, wherein the device housing has a device housing mass associated therewith, further wherein the interface assembly has an interface assembly mass associated therewith, wherein the device housing mass is greater than the interface assembly mass.

14. The electronic device of claim 13, wherein the device housing mass is at least two times greater than the interface assembly mass.

15. The electronic device of claim 1, wherein the device housing comprises further a support plate coupled thereto, wherein the electronic device further comprises an interface housing coupled to the interface assembly and disposed about the user interface surface, wherein the interface housing is movably coupled to the support plate such that the interface assembly can be moved from a first, retracted position to a second, extended position by one of sliding the interface assembly relative to the device housing or rotating the interface assembly relative to the device housing.

16. The electronic device of claim 1, wherein the interface assembly is configured to oscillate at a predetermined resonant frequency corresponding to a motion frequency of the motion generation device.

17. A portable electronic device configured to deliver a haptic response to a user, the portable electronic device comprising:
   a lower assembly comprising a device housing having a mechanical support plate fixedly disposed therein, the mechanical support plate defining at least two boss apertures; and an upper assembly configured to move substantially independently relative to the lower assembly, the upper assembly comprising:
a display lens;
at least one piezo-electric motion generation device affixed to the display lens;
a display assembly affixed to the display lens;
a cantilever spring member disposed between the mechanical support plate and the display assembly, the cantilever spring member being configured to bias the upper assembly away from the lower assembly; and a plurality of boss members, coupled to the upper assembly and passing through the a plurality of boss apertures so as to retain the upper assembly and the lower assembly together.

18. The portable electronic device of claim 17, wherein the plurality of boss members are configured such that, upon actuation of the at least one piezo-electric motion generation device, the upper assembly is permitted to move along a lengthwise boss member axis relative to the lower assembly a distance of one millimeter or less.

* * * * *